(12) United States Patent
Agarwal et al.

(10) Patent No.: US 9,785,891 B2
(45) Date of Patent: *Oct. 10, 2017

(54) MULTI-TASK CONDITIONAL RANDOM FIELD MODELS FOR SEQUENCE LABELING

(71) Applicant: XEROX CORPORATION, Norwalk, CT (US)

(72) Inventors: Arvind Agarwal, Rochester, NY (US); Saurabh Kataria, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 358 days.

This patent is subject to a terminal disclaimer.

(21) Appl. No.: 14/564,138

(22) Filed: Dec. 9, 2014

(65) Prior Publication Data

US 2016/0162804 A1  Jun. 9, 2016

(51) Int. Cl.
*G06N 99/00* (2010.01)
*G06Q 30/00* (2012.01)

(52) U.S. Cl.
CPC ......... *G06N 99/005* (2013.01); *G06Q 30/016* (2013.01)

(58) Field of Classification Search
CPC ........................... G06N 99/005; G06Q 30/016
USPC ........................................................ 706/12
See application file for complete search history.

(56) References Cited

U.S. PATENT DOCUMENTS

| 2006/0085190 A1* | 4/2006 | Gunawardana | ......... G10L 15/14 704/256.3 |
|---|---|---|---|
| 2007/0067171 A1* | 3/2007 | Mahajan | ............... G10L 15/063 704/256.2 |
| 2008/0249764 A1* | 10/2008 | Huang | ................ G06F 17/2785 704/9 |
| 2012/0130771 A1* | 5/2012 | Kannan | ............ G06Q 10/06398 705/7.32 |

(Continued)

OTHER PUBLICATIONS

Agarwal A. et al., "Multitask Learning for Sequence Labeling Tasks", Apr. 25, 2014. (Date and authors precludes usage).*

(Continued)

*Primary Examiner* — Dave Misir
(74) *Attorney, Agent, or Firm* — Jones Robb PLLC

(57) ABSTRACT

Embodiments of a computer-implemented method for automatically analyzing a conversational sequence between multiple users are disclosed. The method includes receiving signals corresponding to a training dataset including multiple conversational sequences; extracting a feature from the training dataset based on predefined feature categories; formulating multiple tasks for being learned from the training dataset based on the extracted feature, each task related to a predefined label; and providing a model for each formulated task, the model including a set of parameters common to the tasks. The set includes an explicit parameter, which is explicitly shared with each of the formulated tasks. The method further includes optimizing a value of the explicit parameter to create an optimized model; creating a trained model for the formulated tasks using the optimized value of the explicit parameter; and assigning predefined labels for the formulated tasks to a live dataset based on the corresponding trained model.

25 Claims, 11 Drawing Sheets

(56) References Cited

U.S. PATENT DOCUMENTS

| | | | |
|---|---|---|---|
| 2014/0067375 A1* | 3/2014 | Wooters | G06F 17/279 |
| | | | 704/9 |
| 2014/0280621 A1* | 9/2014 | Bourdaillet | G06Q 10/107 |
| | | | 709/206 |
| 2015/0032724 A1* | 1/2015 | Thirugnanasundaram | |
| | | | G06F 17/30654 |
| | | | 707/722 |
| 2015/0189086 A1* | 7/2015 | Romano | H04M 3/5175 |
| | | | 379/265.09 |
| 2015/0249742 A1* | 9/2015 | Li | H04M 3/42348 |
| | | | 455/414.1 |

OTHER PUBLICATIONS

Agarwal A. et al., "Multi-Task CRF Model for Predicting Issue Resolution Status in Social Media based Customer Care", KDD 2014. (Date and authors precludes usage).*

Agarwal, A., III Daume, H., and Gerber, S. Learning multiple tasks using manifold regularization. In Advances in neural information processing systems (2010), pp. 46-54.

Argyriou, A., Micchelli, C. A., Pontil, M., and Ying, Y. A spectral regularization framework for multi-task structure learning. In NIPS '08. 2008.

Belkin, M., Niyogi, P., and Sindhwani, V. Manifold regularization: A geometric framework for learning from labeled and unlabeled examples. J. Mach. Learn. Res. 7 (2006), 2399-2434.

Caruana, R. Multitask learning. In Machine Learning (1997), pp. 41-75.

Daume III, H. Bayesian multitask learning with latent hierarchies. In Conference on Uncertainty in Artificial Intelligence '09 (Montreal, Canada, 2009).

Evgeniou, T., Micchelli, C. A., and Pontil, M. Learning multiple tasks with kernel methods. JMLR 6 (2005), 615-637.

Jacob, L., Bach, F., and Vert, J.-P. Clustered multi-task learning: A convex formulation. In NIPS '08 (2008).

Liu, Q., Liao, X., Carin, H. L., Stack, J. R., and Carin, L. Semisupervised multitask learning. IEEE 2009 (2009).

Evgeniou and Pontil, M. Regularized multi-task learning. In KDD 2004 (2004), pp. 109-117.

Schwaighofer, A., Tresp, V., and Yu, K. Learning gaussian process kernels via hierarchical Bayes. In Advances in Neural Information Processing Systems (2004), pp. 1209-1216.

Sutton, C., McCallum, A., and Rohanimanesh, K. Dynamic conditional random fields: Factorized probabilistic models for labeling and segmenting sequence data. The Journal of Machine Learning Research 8 (2007), 693-723.

Tjong Kim Sang, E. F., and Buchholz, S. Introduction to the conll-2000 shared task: Chunking. In Proceedings of the 2nd workshop on Learning language in logic and the $4^{th}$ conference on Computational natural language learning—vol. 7 (2000), Association for Computational Linguistics, pp. 127-132.

Xue, Y., Liao, X., Carin, L., and Krishnapuram, B. Multi-task learning for classification with dirichlet process priors. J. Mach. Learn. Res. 8 (2007), 35-63.

Yu, K., Tresp, V., and Schwaighofer, A. Learning gaussian processes from multiple tasks. In ICML '05 (2005).

* cited by examiner

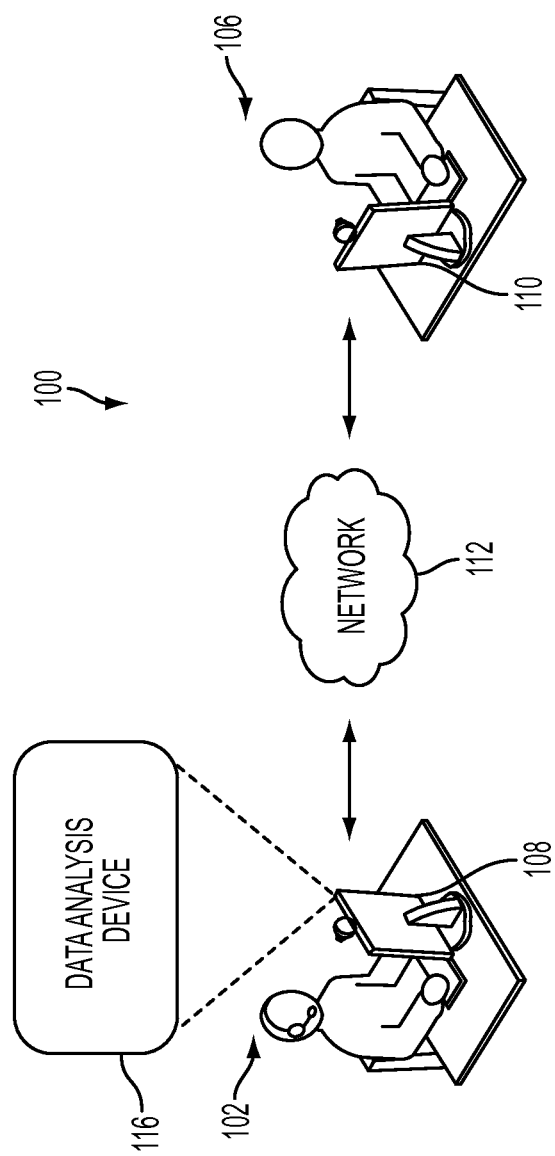

| LABEL CATEGORY | DESCRIPTION | EXAMPLE |
|---|---|---|
| OPEN | WHEN A CONVERSATION IS ONGOING AND A FURTHER MESSAGE IS EXPECTED TO FOLLOW | @DALEGLASS07 HI, THAT'S NOT GOOD |
| SOLVED | WHEN THE CURRENT MESSAGE SOLVES THE PROBLEM MENTIONED IN THE CURRENT CONVERSATION, WITHOUT REQUIRING ANY FURTHER MESSAGE | NO, YOUR PAYMENT WOULD JUST INCREASE BY $5 A MONTH AND YOU WILL KEEP YOUR SHRINKAGE MILESTONE |
| CLOSED | WHEN THE CURRENT MESSAGE CLOSES THE CONVERSATION, EVEN IF THE PROBLEM IS NOT SOLVED | @UNCRWNDKINGS WE WOULD RALLY HATE TO SEE YOU GO |
| CHANGE CHANNEL | WHEN THE CRM AGENT ASKS THE CUSTOMER TO CHANGE CHANNEL BY SENDING AN EMAIL OR A DIRECT MESSAGE. IN THIS CASE, THE CONVERSATION HALTS SINCE FURTHER EXCHANGES ARE ON OTHER PRIVATE CHANNELS | CAN YOU PLEASE EMAIL ME DIRECTLY AT BSTSOCIALCARE@SPRINT.COM AND I WILL GLADLY LOOK INTO THIS |

| LABEL CATEGORY | DESCRIPTION | EXAMPLE |
|---|---|---|
| COMPLAINT | WHEN A CUSTOMER COMPLAINS | @VMUCARE I'VE SENT AN EMAIL, BUT I AM ABSOLUTELY DISGUSTED WITH THE CUSTOMER CARE I AM RECEIVING |
| APOLOGY | WHEN AN AGENT APOLOGIES | @KRISTENMCHUGH22I DO APOLOGIZE FOR THE INCONVENIENCE |
| ANSWER | WHEN SOMEONE ANSWERS A REQUEST | @BOOSTCARE YEA, ALLOW MY TEXTS AND CALLS TO GO OUT |
| RECEIPT | WHEN SOMEONE ACKNOWLEDGES RECEIPT | @VMUCARE OK |
| COMPLIMENT | WHEN SOMEONE SENDS A COMPLIMENT | I STILL LOVE VM AND MY INTERCEPT |
| RESPONSE TO POSITIVITY | WHEN SOMEONE ACKNOWLEDGES A PREVIOUS POSITIVE MESSAGE | @HARRYRUIZ NO PROBLEM! |
| REQUEST | WHEN SOMEONE REQUESTS INFORMATION | PLEASE HELP ME OUT |
| GREETING | GREETINGS | @LUCUSHUGHES13 HI THERE! |
| THANK | WHEN SOMEONE EXPRESSES THANKS | THANK YOU FOR BEING SO PATIENT |
| ANNOUNCEMENT | WHEN A CUSTOMER ANNOUNCES AN INFORMATION | @VMUCARE PHONE STOLEN LAST NIGHT |
| SOLVED | WHEN A MESSAGE CLEARLY STATES THAT A PROBLEM IS SOLVED | CLOSE ONE! |
| OTHER | ANY OTHER MESSAGE | WOW! |

FIG. 3

| DIALOGUE ACT | ISSUE STATUS | TEXT |
|---|---|---|
| COMPLAINT | OPEN | THIS MOBILE IS MAKING MY LIFE HARD |
| REQUEST | OPEN | @USER_X IS THERE ANYTHING WE IN THE SOCIAL MEDIA TEAM CAN ASSIST YOU WITH? |
| COMPLAINT | OPEN | SO I CAN'T MAKE OR RECEIVE CALLS & I CAN'T SEND TEXTS OR RECEIVE THEM. |
| REQUEST | OPEN | @USER_X WHAT IS YOUR ZIP CODE? |
| ANNOUNCEMENT | OPEN | WE CAN CHECK FOR OUTAGES FOR YOU. |
| ANSWER | SOLVED | @USER_X YOUR EXPERIENCING TOWER OUTAGE |
| ANSWER | SOLVED | IT IS ESTIMATED TO BE CLEARED BY THE 21ST OF FEBRUARY |

FIG.4

| FEATURE CATEGORY | FEATURE TYPE | DESCRIPTION |
|---|---|---|
| WORD 1-GRAMS AND 2-GRAMS | 1 INTEGER / n-GRAM | THE COUNT OF n-GRAMS OF WORDS THAT COMPOSE THE TWEET SEGMENT |
| SEGMENT POSITION IN THREAD | INTEGER | POSITION OF THE TWEET IN THE THREAD |
| SEGMENT POSITION IN TWEET | INTEGER | POSITION OF THE SEGMENT IN THE TWEET |
| SENDER | BOOLEAN | CRM AGENT OR CUSTOMER |
| CONTAINS EMAIL | BOOLEAN | PRESENCE OF AN EMAIL IN THE TWEET SEGMENT |
| # UPPER CASE | INTEGER | % OF LETTERS IN UPPER CASE IN THE TWEET SEGMENT |
| # PUNCTUATION | INTEGER | % OF PUNCTUATION MARKS IN THE TWEET SEGMENT |
| # SPECIAL PUNCTUATION | INTEGER | % OF ! AND ? PUNCTUATION MARKS, I.E. !!!!!??? |
| POSITIVE SENTIMENT | INTEGER | POSITIVE SENTIMENT SCORE OF THE NGRAMS |
| NEGATIVE SENTIMENT | INTEGER | NEGATIVE SENTIMENT SCORE OF THE NGRAMS |
| CATEGORY OF PREVIOUS SEGMENT | 1 BOOLEAN/CATEGORY | THE CATEGORY OF THE PREVIOUS SEGMENT |
| CATEGORY OF PREVIOUS TWEET / SAME AUTHOR | 1 BOOLEAN/CATEGORY | THE CATEGORY OF THE LAST SEGMENT OF THE PREVIOUS TWEET OF THE SAME AUTHOR |
| CATEGORY OF PREVIOUS TWEET / OTHER AUTHOR | 1 BOOLEAN/CATEGORY | THE CATEGORY OF THE LAST SEGMENT OF THE PREVIOUS TWEET OF THE OTHER AUTHOR |

FIG. 6

MULTI-TASK CONDITIONAL RANDOM FIELD MODELS FOR SEQUENCE LABELING

TECHNICAL FIELD

The presently disclosed embodiments relate to machine learning-based sequence classification, and more particularly to multi-task conditional random field (CRF) models for sequence labeling.

BACKGROUND

Customer Relationship Management (CRM) relates to various models and technologies for managing a company's relationships with its existing, past, and future customers. Some related art CRM systems automate, organize, and synchronize marketing, sales, customer service, and technical support. Customer engagement can be a critical component of social CRM solutions, wherein customer service agents contact customers via social media, and resolve their issues by engaging in asynchronous conversations with the customers. Some CRM systems integrate social media sites like Twitter™, LinkedIn™, and Facebook™ to track and communicate with customers to share their opinions and experiences with a company, products and services. The social media is a platform that connects millions of users together, and allows them to exchange and share common interests, topics or events. These platforms were developed for private usage among users, and later emerged as a new communication and marketing vector for the companies. Social media has grown at a consistent rate, and has become very relevant in the context of brand information.

Related art CRM solutions/systems provide a mechanism for the customer care agents to engage in conversations with customers to address their issues via telephone calls. Two new media that were later handled by CRM teams include synchronous online chat and emails. The new communication vectors provided by social media, essentially Facebook and Twitter, then gained the attention of the CRM teams CRM solutions need to constantly monitor the conversations, mainly for two components of the conversation, in order to provide an effective engagement. First, the status of the issue (issue status tracking) that is relevant to the conversation relates to customer satisfaction. Second, the nature of the dialogues (dialogue act tracking) engaged in by the agents relate to the effectiveness of the customer care agents and the conversation.

The issue status tracking is significant because interaction between a customer and a customer care agent takes place over a long period of time, during which the agent needs to return to the issues multiple times and address the customer's concern. Since one agent is usually involved with thousands of users at the same time, the agent needs to return to only the open issues. The agent should not spend time checking the resolved issues. Given the large number of customers and their data, it is important that the process of figuring out which issues are open and which are closed is automated. The dialogue act problem is important because it determines the nature of the dialogue that agents engage in with the customer. For example, the dialogue can be a simple greeting message, an acknowledgement, or a more involved statement that addresses the issue in a technical way. This dialogue act component helps CRM solutions to determine the effectiveness of the customer care agents and of conversations.

Typically, machine learning methods, such as supervised classification techniques, are employed to analyze these conversations that can track and measure effectiveness of these conversations in terms of issue resolution (issue status) and the nature of the dialogues that customer care agents engage in (i.e., dialogue act). However, due to the very sparse and informal nature of these social media conversations, existing machine learning techniques are not very accurate in terms of detecting issues status and dialogue act.

SUMMARY

One exemplary embodiment includes a computer-implemented method for automatically analyzing a conversational sequence between a plurality of users. The method comprises receiving, using a data collection module on a computer comprising a processor and memory, signals corresponding to a training dataset including a plurality of data sequences related to the conversational sequence; extracting, using a feature extraction module on the computer, at least one feature from the received training dataset based on predefined feature categories; formulating, using a learning module on the computer, a plurality of tasks for being learned from the training dataset based on the extracted at least one feature, wherein each of the plurality of tasks is related to at least one predefined label; providing, using the learning module on the computer, a model for each of the plurality of formulated tasks, wherein the model includes one or more parameters having a set of parameters common to the plurality of formulated tasks, wherein the set of parameters includes at least one explicit parameter being explicitly shared with each of the plurality of formulated tasks; optimizing, using the learning module on the computer, values for the one or more parameters and the at least one explicit parameter to create an optimized model; creating, using the learning module on the computer, a trained model for each of the plurality of formulated tasks using an optimized value of the at least one explicit parameter and corresponding values of the one or more parameters; assigning, using a classification module on the computer, the at least one predefined label for each of the plurality of formulated tasks on to a live dataset based on the corresponding created trained model; and outputting, using the computer, signals corresponding to the live dataset assigned with the at least one predefined label for each of the plurality of formulated tasks.

Another exemplary embodiment includes a system for automatically analyzing a conversation between a plurality of users. The system comprises a data collection module, a feature extraction module, a learning module, and a classification module. The data collection module on a computer comprising a processor and memory configured to receive signals corresponding to a training dataset including a plurality of data sequences related to the conversation. The feature extraction module on the computer configured to extract at least one feature from the received training dataset based on predefined feature categories. The learning module on the computer configured to: (1) formulate a plurality of tasks for being learned from the training dataset based on the extracted at least one feature, wherein each of the plurality of tasks is related to at least one predefined label; (2) provide a model for each of the plurality of formulated tasks, wherein the model includes one or more parameters having a set of parameters common to the plurality of formulated tasks, wherein the set of parameters includes at least one explicit parameter being explicitly shared with each of the plurality of formulated tasks; (3) optimize values for the one or more parameters and the at least one explicit parameter to create an optimized model; and (4) create a trained model for each of the plurality of formulated tasks using an optimized value of the at least one explicit parameter and corresponding values of the one or more parameters. The classification module on the computer configured to assign the at least one predefined label for each of the plurality of formulated tasks on to a live dataset based on the created trained model, wherein the computer is configured to output signals corresponding to the live dataset assigned with the at least one predefined label for each of the plurality of formulated tasks.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1A is a schematic that illustrates a first network environment including an exemplary data analysis device, according to an embodiment of the present disclosure.

FIG. 2 is a table that illustrates exemplary issue status labels for use by the data analysis device of FIG. 1, according to an embodiment of the present disclosure.

FIG. 3 is a table that illustrates exemplary dialogue act labels for use by the data analysis device of FIG. 1, according to an embodiment of the present disclosure.

FIG. 4 is a table that illustrates an exemplary correlation between the issue status labels of FIG. 2 and the dialogue act labels of FIG. 3, according to an embodiment of the present disclosure.

FIG. 6 is a table that illustrates an exemplary set of feature definitions for a tweet sequence in Twitter™ for use by the data analysis device of FIG. 1 according to an embodiment of the present disclosure.

DETAILED DESCRIPTION

Figure 1B:
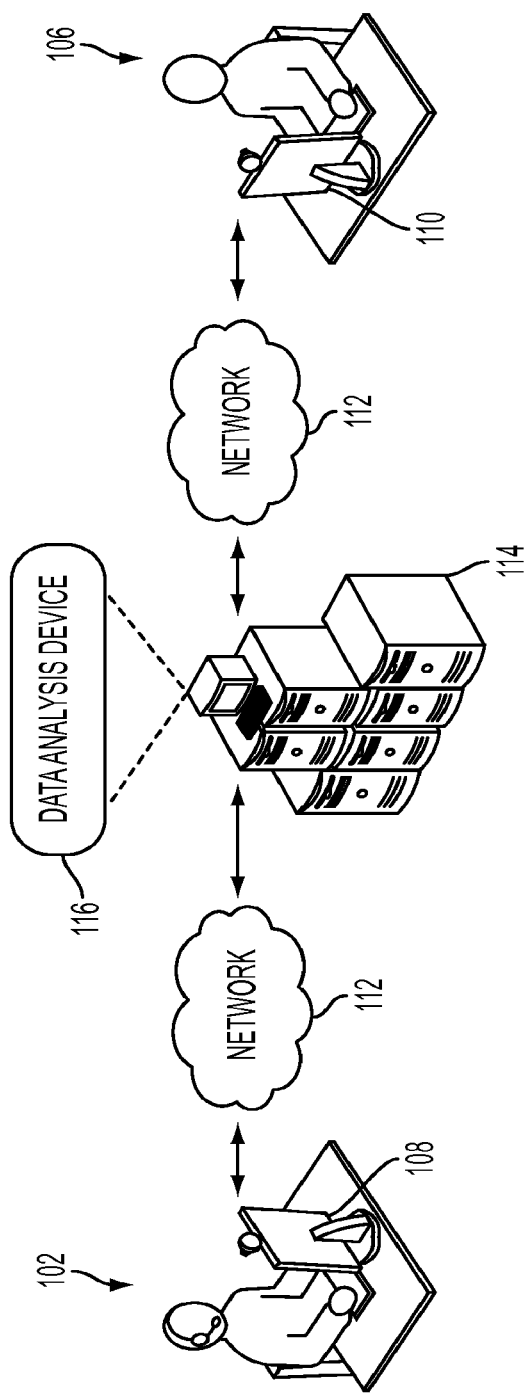
FIG. 1B is a schematic that illustrates a second network environment including the data analysis device of FIG. 1, according to an embodiment of the present disclosure.

The following detailed description is made with reference to the figures. Some of the embodiments are described to illustrate the disclosure, not to limit its scope, which is defined by the claims. Those of ordinary skill in the art will recognize a number of equivalent variations in the description that follows.

Definitions

A "Customer Relationship Management (CRM)" is used in the present disclosure in the context of its broadest definition. The CRM may refer to use of various models and technologies for managing relationship between a company and its existing, past, and future customers.

A "CRM system" is used in the present disclosure in the context of its broadest definition. The CRM system may refer to a system for automating, organizing, and synchronizing marketing, sales, customer service and technical support in a company. The CRM system may include software, hardware, or combination of hardware and software.

A "social-CRM" is used in the present disclosure in the context of its broadest definition. The social-CRM may refer to a CRM involving various models and technologies for managing relationship between a customer and company officials such as customer service agents via social media. In social-CRM scenarios, multiple customer service agents may engage with multiple customers through online conversations in asynchronous or synchronous manner.

A "social media" is used in the present disclosure in the context of its broadest definition. The social media may refer to an online or offline platform capable of connecting multiple users simultaneously, and allowing them to communicate with each other either synchronously or asynchronously. Examples of social media may include, but not limited to, Twitter™, Facebook™, LinkedIn™, and WhatsApp™.

A "social-CRM system" is used in the present disclosure in the context of its broadest definition. The social-CRM system may refer to a CRM system, which may entail company officials such as customer service agents to communicate with one or more customers via social media, and resolve their issues by having asynchronous conversations with them over the social media.

A "task" is used in the present disclosure in the context of its broadest definition. The task may refer to an operation to be performed on a dataset. The task may be associated with at least one primary label sequence and may optionally include one or more secondary label sequences. In some examples, the task may correspond to a problem to be resolved such as, but not limited to, determining status of an issue in a conversation and determining nature of the conversation.

A "training dataset" is used in the present disclosure in the context of its broadest definition. The training dataset may refer to a natural language text sequence including a number of sentences of a conversation that occur between a number of users such as, between a customer service agent and one or more customers.

A "sentence" is used in the present disclosure in the context of its broadest definition. The sentence may refer to a sequence of words in a particular natural language such as English, Spanish, French, Chinese, Sanskrit, Hindi, etc.

A "feature" or "feature vector" is used in the present disclosure in the context of its broadest definition. The feature may refer to a property of an entity such as a sentence, a person, or an object. Examples of the property may include words in the sentence, age of the person, shape of the object, and so on.

A "model" or "equation" is used in the present disclosure in the context of its broadest definition. The model may refer to a mathematical representation of the task involving one or more parameters, each of which may correspond to the feature.

Exemplary Embodiments

The various embodiments describe systems and methods of multi-task learning of conversational sequences when there exists some commonality between tasks either through data or through the tasks. The embodiments include performing sequence classification that can analyze multiple labeled sequences and learn from the multiple sequences simultaneously. The embodiments exploit the label dependency but also learn the multiple tasks simultaneously by explicitly sharing the parameters corresponding to the label dependency factor. The methods and systems of the embodiments can detect an issue status and dialogue act of an interaction between two users who are transmitting conversational data. The embodiments represent an improvement over conventional factorial CRF models.

FIG. 1A is a schematic that illustrates a first network environment 100 including an exemplary data analysis device, according to an embodiment of the present disclosure. Some embodiments are disclosed in the context of network environments that represent a first user, such as a customer service agent 102, engaged in an asynchronous interaction with a second user such as customer 106, over a communication network 112. In an embodiment, communication network 112 may include any software, hardware, or application that provides two or more users a medium to exchange signals, such as those corresponding to conversational sequences. Communication network 112 may include, but is not limited to, social media platforms implemented as a website, a unified communication application, or a stand-alone application such as a chat program. Examples of the social media platforms may include, but not limited to, Twitter™, Facebook™, LinkedIn™, Skype™, Microsoft Lync™, Cisco Webex™, and Google Hangouts™. However, other embodiments may be applied in the context of other business or social-CRM scenarios involving interactions between different entities including customers, employees, colleagues, vendors, consultants, and so on. Examples of such scenarios may include, but are not limited to, bank agents handling customer account workflows or similar processes, hospital agents handling patient records, healthcare professionals handling patient interactions in a telehealth environment, online retail agents handling customer requests and queries, teachers or students handling e-coursework, etc.

The agent 102 and the customer 106 may communicate with each other using an agent device 108 and a customer device 110, respectively, in different network environments. In a first embodiment (FIG. 1A), the agent device 102 may be installed, integrated, or operated in association with a data analysis device 116 to communicate with the client device over the network 112. The network 112 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 112 may include multiple networks or sub-networks, each of which may include, for example, a wired or wireless data pathway. The network 112 may include a circuit-switched voice network, a packet-switched data network, or any other network able to carry electronic communications. For example, the network 112 may include networks based on the Internet protocol (IP) or asynchronous transfer mode (ATM), and may support voice using, for example, VoIP, Voice-over-ATM, or other comparable protocols used for voice, video, and data communications.

Each of the agent device 108 and the customer device 110 may be implemented as any of a variety of computing devices, including, for example, a server, a desktop PC, a notebook, a workstation, a personal digital assistant (PDA), a mainframe computer, a mobile computing device, an internet appliance, and so on. The agent device 108 may be configured to exchange at least one of text messages, audio interaction data (for example, voice calls, recorded audio messages, etc.), and video interaction data (for example, video calls, recorded video messages, etc.) with the customer device 110, or in any combination thereof. The customer device 110 may include calling devices (e.g., a telephone, an internet phone, etc.), texting devices (e.g., a pager), or computing devices including those mentioned above.

The data analysis device 116 may be configured to at least one of: (1) communicate synchronously or asynchronously with one or more software applications, databases, storage devices, or appliances operating via same or different communication protocols, formats, database schemas, platforms or any combination thereof, to receive data signals; (2) collect, record, and analyze data including conversation sequences of a variety of known, related art, and later developed natural languages such as English, Hindi, Sanskrit, Mandarin, Spanish, and so on; (3) formulate one or more tasks for being learned from the data or datasets such as conversation sequences; (4) provide, execute, communicate, assist in formulating one or more mathematical models for each task, such that the models explicitly share at least one parameter which is common to each of the models; (5) training the models for the tasks simultaneously using the data or datasets; (6) assigning at least one label associated with each task to the data or datasets based on the trained models; and (7) transfer or map the models, tasks, shared parameter, labeled data or datasets, or any combination thereof to one or more networked computing devices and/or data repositories.

The data analysis device 116 may be configured to collect a variety of communication data, such as CRM data, from one or more networked devices such as the customer device 110. In one example, the data analysis device 116 may be configured to host, or communicate with, a variety of known, related art or later developed social media platforms, which may interface with the customer device 110 for enabling the customer 106 to interact with a customer service agent 102 through various modes, such as text messages, audio interactions (e.g., voice calls, recorded audio messages, etc.), and video interactions (e.g., video calls, recorded video messages, etc.), or any combination thereof.

In one embodiment, the data analysis device 116 may receive signals corresponding to a conversation including one or more conversation sequences between two users as a training dataset. The conversation may include natural language sequences (NLP sequences), each of which may be classified using one or more predetermined labels such as issue status labels and dialogue act labels. In an embodiment, an issue status label may indicate operational status of a conversation sequence in an agent-customer conversation taking place during a customer service communication.

FIG. 2 is a table 200 that illustrates exemplary issue status labels for the customer service communication, namely, "OPEN", "SOLVED", "CLOSED", and "CHANGE CHAN- NEL" under a column "Label Category" in the table 200. The label "OPEN" may indicate an unresolved activity being referred by a conversation sequence. The label "OPEN" may also indicate that a further conversation sequence may follow. Similarly, other issue status labels are explained in FIG. 2. While table 200 lists specific issue status labels for a CRM solution, issue status labels of the embodiments could be any issue status labels that are useful for issue status tracking in a conversation sequence.

Similarly, a dialogue act label may indicate the nature of the dialogue that a first user engages with a second user in the above embodiment. For example, between an agent and customer, the dialogue can be a simple greeting message, an acknowledgement, or a more involved statement that addresses the issue in a technical way. Such a dialogue act component, for example, the dialogue act label, helps CRM solutions to determine the effectiveness of agents and of conversations. FIG. 3 is a table 300 that illustrates exemplary dialogue act labels, namely, "COMPLAINT", "APOLOGY", "ANSWER", "RECEIPT", "COMPLIMENT", "RESPONSE TO POSITIVITY", "REQUEST", "GREETING", "THANK", "ANNOUNCEMENT", "RESOLVED", and "OTHER". Each dialogue act label in table 300 may refer to the nature of a conversation sequence in the agent-customer conversation. For example, at row 302 in the table 300, the dialogue act label "Announcement" may indicate information being announced in a conversation sequence by the customer 106. While table 300 lists specific dialogue act labels for a CRM solution, dialogue act labels of the embodiments could be any dialogue act labels that are useful for dialogue act tracking in a conversation sequence.

These predetermined labels, such as the issue status labels and the dialogue act labels, may be correlated with each other. For example, a conversation sequence may correspond to a customer complaint (referring to dialogue information) and simultaneously describe an active issue (referring to a conversation status as active) with a certain product or service to the customer service agent 102. FIG. 4 is a table 400 that illustrates an exemplary correlation between the dialogue act labels and the issue status labels for a conversation sequence in the agent-customer conversation. In the table 400, the dialogue act labels are listed under a column header "Dialogue Act" and the issue status labels are listed under a column header "Issue Status". Both of these labels may be correlated based on one or more features in a conversation sequence. For example, at row 402 in table 400, a conversation sequence "@user_x what is your zip code?" may be associated with an issue status label "OPEN" and a dialogue act label "REQUEST" based on the word "What" behaving as a feature of the conversation sequence.

The data analysis device 116 may represent any of a wide variety of devices capable of providing data classification or labeling services for the network devices. The data analysis device 116 may be implemented as a standalone and dedicated "black box" including hardware and installed software, where the hardware is closely matched to the requirements and/or functionality of the software. Alternatively, the data analysis device 116 may be implemented as a software application or a device driver. The data analysis device 116 may enhance or increase the functionality and/or capacity of the network, such as the network 112, to which it is connected. In some embodiments, the data analysis device 116 may be configured, for example, to perform e-mail tasks, security tasks, network management tasks including IP address management, and other tasks. In some other embodiments, the data analysis device 116 may be configured to expose its computing environment or operating code to a user, and may include related art I/O devices, such as a keyboard or display. The data analysis device 116 of some embodiments may, however, include software, firmware, or other resources that support remote administration and/or maintenance of the data analysis device 116.

In further embodiments, the data analysis device 116 either in communication with any of the networked devices such as the agent device 108, or independently, may have video, voice, and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the data analysis device 116 may comprise or implement one or more real time protocols (e.g., session initiation protocol (SIP), H.261, H.263, H.264, H.323, etc.) and non-real time protocols known in the art, related art, or developed later to facilitate data transfer among the agent device 108, the customer device 110, the data analysis device 116, and any other network device.

In some embodiments, the data analysis device 116 may be configured to convert communications, which may include instructions, queries, data, etc., from the customer device 110 into appropriate formats to make these communications compatible with the agent device 108, and vice versa. Consequently, the data analysis device 116 may allow implementation of the customer device 110 using different technologies or by different organizations, for example, a third-party vendor, managing the customer device 110 or associated services using a proprietary technology.

In another embodiment (FIG. 1B), the agent device 108 may be configured to interact with the customer device 110 via a server 114 over the network 112. The server 114 may be installed, integrated, or operatively associated with the data analysis device 116. The server 114 may be implemented as any of a variety of computing devices including, for example, a general purpose computing device, multiple networked servers (arranged in clusters or as a server farm), a mainframe, or so forth.

Figure 1C:
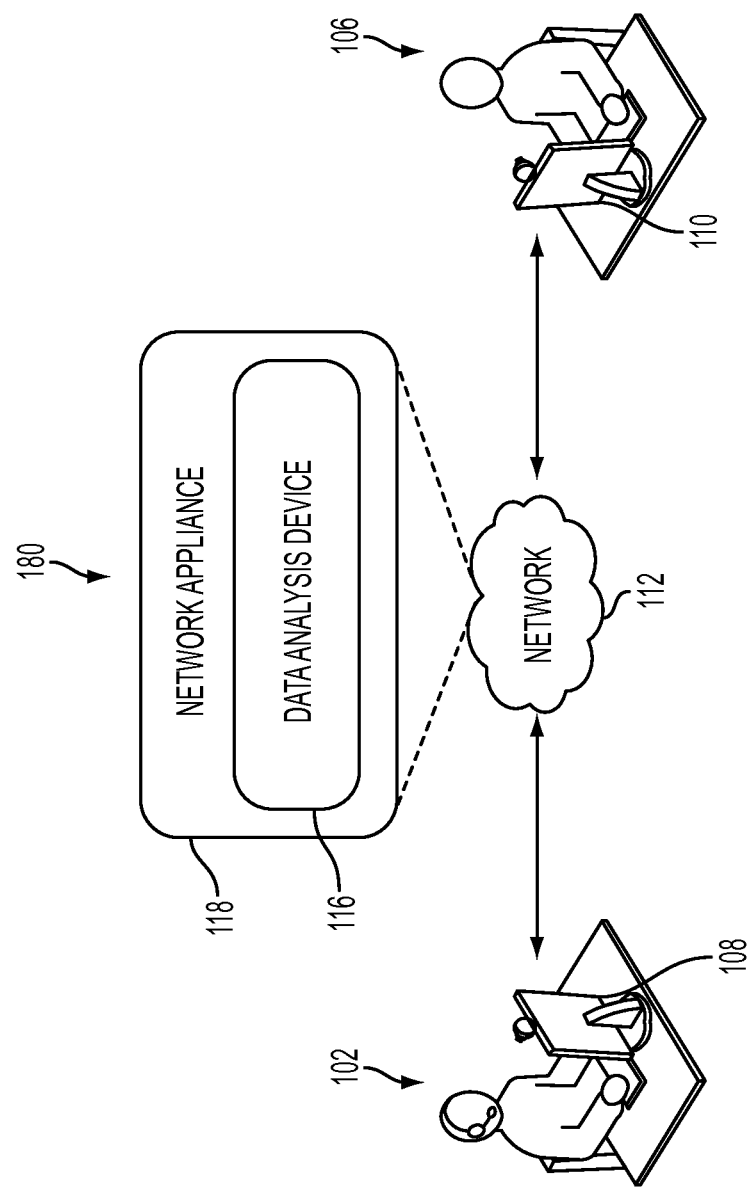
FIG. 1C is a schematic that illustrates a third network environment including the data analysis device of FIG. 1, according to an embodiment of the present disclosure.

In other embodiments (FIG. 1C), the data analysis device 116 may be installed on or integrated with any network appliance 118 configured to establish the network 112 between the agent device 108 and the customer device 110. At least one of the data analysis device 116 and the network appliance 118 may be capable of operating as or providing an interface to assist exchange of software instructions and data among the agent device 108, the customer device 110, and the data analysis device 116. In some embodiments, the network appliance 118 may be preconfigured or dynamically configured to include the data analysis device 116 integrated with other devices. For example, the data analysis device 116 may be integrated with the agent device 108 (as shown in FIG. 1A), the server 114 (as shown in FIG. 1B) or any other user device (not shown) connected to the network 112. The agent device 108 may include a module (not shown), which enables that the agent device 108 being introduced to the network appliance 118, thereby enabling the network appliance 118 to invoke the data analysis device 116 as a service. Examples of the network appliance 118 include, but are not limited to, a DSL modem, a wireless access point, a router, a base station, and a gateway having a predetermined computing power sufficient for implementing the data analysis device 116.

Figure 5:
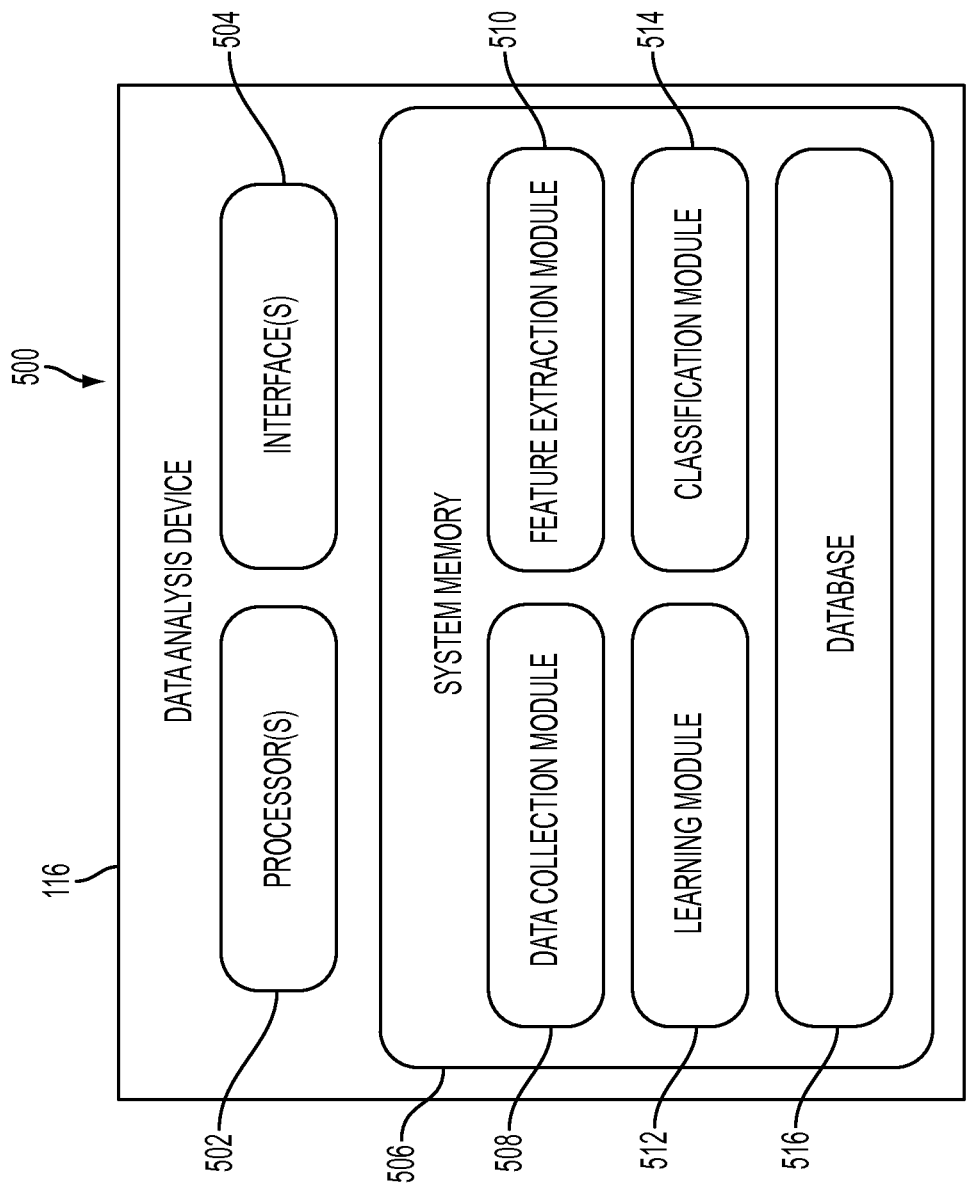
FIG. 5 is the exemplary data analysis device of FIG. 1, according to an embodiment of the present disclosure.

As illustrated in FIG. 5, the data analysis device 116 may be implemented by way of a single device (e.g., a computing device, a processor or an electronic storage device) or a combination of multiple devices that are operatively connected or networked together. The data analysis device 116 may be implemented in hardware or a suitable combination of hardware and software. In some embodiments, the data analysis device 116 may be a hardware device including processor(s) 502 executing machine readable program instructions for analyzing data, and interactions between the agent device 108 and the customer device 110. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) 502 may include, for example, microprocessors, microcomputers, microcontrollers, digital signal processors, central processing units, state machines, logic circuits, and/or any devices that manipulate signals based on operational instructions. Among other capabilities, the processor(s) 502 may be configured to fetch and execute computer readable instructions in a memory associated with the data analysis device 116 for performing tasks such as signal coding, data processing input/output processing, power control, and/or other functions.

In some embodiments, the data analysis device 116 may include, in whole or in part, a software application working alone or in conjunction with one or more hardware resources. Such software applications may be executed by the processor(s) 502 on different hardware platforms or emulated in a virtual environment. Aspects of the data analysis device 116 may leverage known, related art, or later developed off-the-shelf software. Other embodiments may comprise the data analysis device 116 being integrated or in communication with a mobile switching center, network gateway system, Internet access node, application server, IMS core, service node, or some other communication systems, including any combination thereof. In some embodiments, the data analysis device 116 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The data analysis device 116 may automatically classify interactions between the agent device 108 and the customer device 110 over the network 112 using one or more predetermined labels. These interactions may include queries, instructions, conversations, or data from the customer device 110 to the agent device 108 and/or the data analysis device 116, and vice versa. The data analysis device 116 may include a variety of known, related art, or later developed interface(s) 504, including software interfaces (e.g., an application programming interface, a graphical user interface, etc.); hardware interfaces (e.g., cable connectors, a keyboard, a card reader, a barcode reader, a biometric scanner, an interactive display screen, etc.), or both.

The data analysis device 116 may further include a system memory 506 for storing at least one of: (1) files and related data including metadata, for example, data size, data format, creation date, associated tags or labels, related documents, messages or conversations, etc.; and (2) a log of profiles of network devices and associated communications including instructions, queries, conversations, data, and related metadata; (3) predefined mathematical models or equations; and (4) predetermined labels. The system memory 506 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The system memory 506 may include one or more databases such as a database 516, which may be sub-divided into further databases for storing electronic files. The system memory 506 may have one of many database schemas known in the art, related art, or developed later for storing data from the customer device 110 via the data analysis device 116. For example, the database 516 may have a relational database schema involving a primary key attribute and one or more secondary attributes. In some embodiments, the data analysis device 116 may perform one or more operations, but not limited to, reading, writing, indexing, labeling, updating, and modifying the data, and may communicate with various networked computing devices.

In one embodiment, the system memory 506 may include various modules such as a data collection module 508, a feature extraction module 510, a learning module 512, and a classification module 514. The data collection module 508 may be configured to collect or receive signals corresponding to agent-customer conversation-related data as a training dataset from the customer device 110 via one or more inputs such as social media platforms. In one instance, the training dataset may include text conversations or messages in various alphanumeric formats. In another instance, the training dataset may include audio or video messages/conversations, which may be converted into text format using known in the art, related art, or developed later hardware and software modules controlled by the processor(s) 502 so that the converted text messages/conversations may be received by the data collection module 508. In yet another instance, the training dataset can include metadata and unstructured network and server data.

In one example, the data collection module 508 may asynchronously receive one or more conversation sequences (e.g., a sentence, a phrase, a clause, or any other type of text sequence) in natural language (e.g., English, Japanese, Portuguese, Russian, French, etc.) as a training dataset from the customer device 110. Each of the conversation sequences may be pre-labeled based on one or more predetermined aspects such as nature of dialogue and state of issue being referred to by that conversation sequence. The sequence may be tagged with labels corresponding to such predetermined aspects. These labels may be correlated, for example, the nature of dialogues between the agent 102 and the customer 106 may indicate the current status of the issue. Similar to examples discussed above with respect to FIG. 4, the nature of dialogues may be a simple greeting message, an acknowledgement, or a complaint indicating an unresolved technical question present in the conversation sequence. The correlations among labels may not be specific to customer service domain and may be exhibited in other domains such as natural language processing (NLP) where words in a sentence may be labeled with their Part of Speech (POS) tags as well as noun phrase (NP) chunks.

In one embodiment, the data collection module 508 may synchronously or asynchronously receive Twitter conversations between the customer 106 and the customer service agent 102 as the training dataset. Such conversations may include natural language text sequences having multiple words, emoticons, symbols (e.g., at sign "@", hash "#", underscore "_", etc.), and so on. In one embodiment, the conversations in the training dataset may be pre-labeled based on one or more aspects such as: (1) nature of dialogue between the customer 106 and the customer service agent 102 (namely, Dialogue Act); and (2) nature of state of the issue being discussed by the customer 106 and the agent 102 (namely, Issue Status).

The feature extraction module 510 may be configured to extract one or more features from each of the text sequences (e.g., conversation sequences) in the training dataset. The features may be extracted based on predefined feature definitions, which may be stored in the database 516. In one example, the feature extraction module 510 may automatically extract a set of features associated with each sequence in a training dataset corresponding to the conversations between a customer service agent 102 and a customer 106, based on predefined feature definitions. FIG. 6 is a table 600 that illustrates an exemplary set of feature definitions for a tweet segment in Twitter™. The table 600 includes multiple rows representing feature definitions, each of which is characterized by a feature category, a feature type, and a feature description. For example, a feature definition 602 refers to a feature category "Sender" having a feature type "Boolean". In one example, the feature category "Sender" may have a value being the name of a customer service agent 102 or a customer 106.

In some embodiments, the feature extraction module 510 may extract at least one feature from the one or more sequences such as sentences by removing stop words, masking @usernames, masking uniform resource locators (URLs), masking emails, masking numbers, masking emoticons as positive, neutral, or negative, and so on. Multiple features may be extracted from the sentences in the training dataset. In some other embodiments, the feature extraction module 510 may associate a range of features to each of the one or more sentences in the conversation.

The learning module 512 may be configured to learn or perform various predetermined tasks on a training dataset. For example, the learning module 512 may be configured to learn or perform one or more predetermined tasks corresponding to multi-task sequence labeling on conversation sequences in the training dataset. Examples of these tasks may include, but not limited to, determination of issue status (hereinafter referred to as Task 1) and determination of nature of conversation or dialogues (hereinafter referred to as Task 2) between the customer service agent 102 and the customer 106. Each of the tasks may be implemented through a predetermined mathematical model or equation by the learning module 512. The model may be based on a proximity-based multitask learning framework for sequence classification, which may support simultaneous learning of tasks such as Task 1 and Task 2 using corresponding label sequences associated with the training dataset.

In one example, the learning module 512 may represent a predetermined model for each of the tasks, i.e., Task 1 and Task 2, as a conditional probability density, p(y, z|x), where $x=(x_1, x_2, \ldots x_T)$ may be a sequence of extracted features (e.g., words in a sentence or conversation sequence), which may be labeled; and $y=(y_1, y_2, \ldots y_T)$ and $z=(z_1, z_2, \ldots z_T)$ may represent predetermined sets of label sequences associated with Task 1 and Task 2, respectively, for x. Hence, the training dataset may be assumed to be a triplet of (x, y, z) representing the issue status label sequences and the dialogue act label sequences being associated with 'i' number of conversation sequences, i.e., $(x_i, y_i, z_i)$, where 'i' may range from one to n, which may correspond to the total number of conversation sequences in the training dataset. The conditional probability density p(y, z|x) may be based on a linear chain conditional random fields (CRFs) defined for predetermined types of cliques for Task 1 and Task 2.

Figure 7:
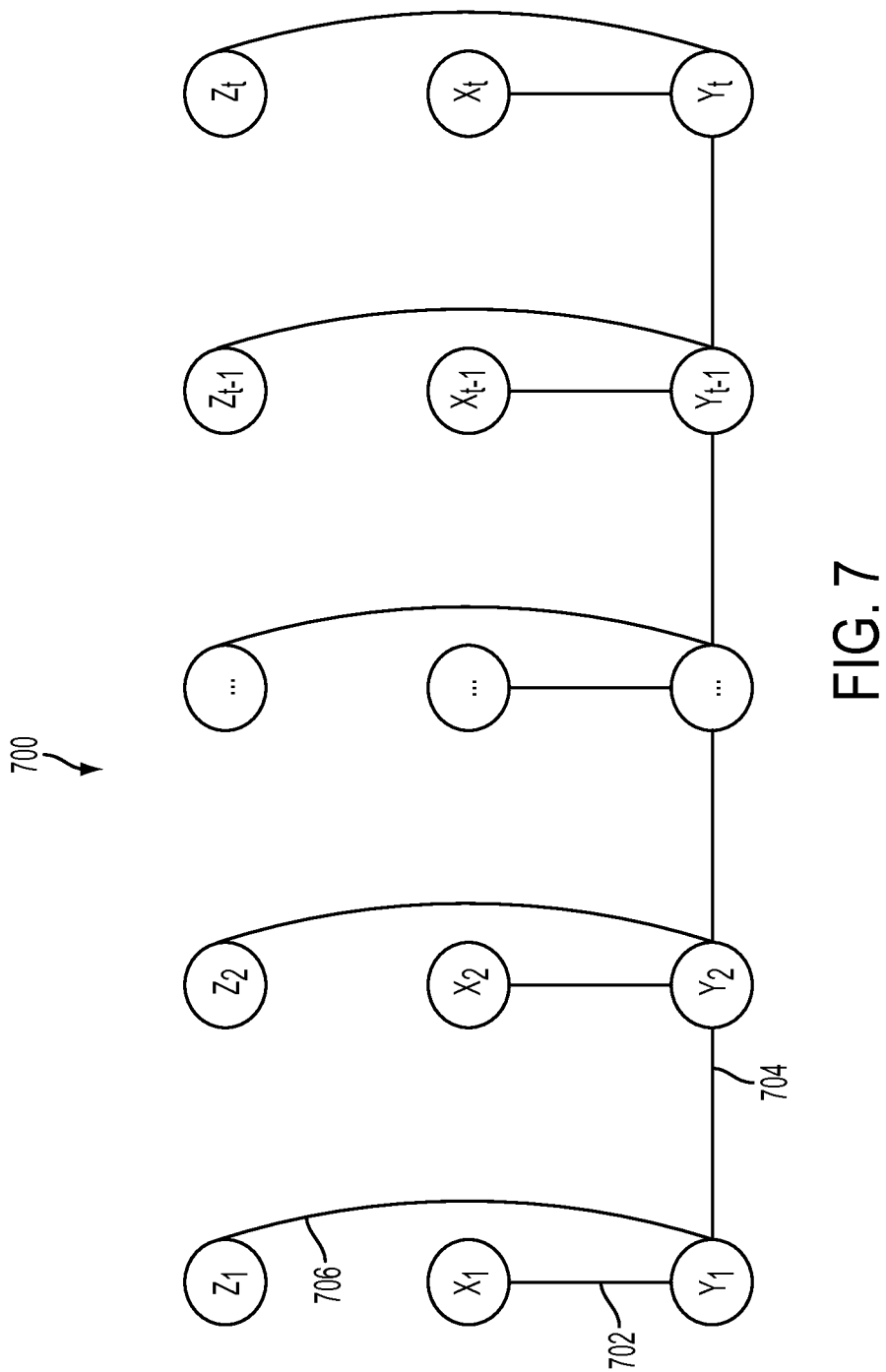
FIG. 7 is a schematic of an exemplary first type of clique for use by the data analysis device of FIG. 1, according to an embodiment of the present disclosure.

As shown in FIG. 7, an exemplary first type of clique 700 for Task 1 may include multiple nodes $x_t$, $y_t$, $z_t$ for modeling the conditional probability density of the labels $y_t$ for the conversation sequences $x_t$, where 't' may range from one to the total number of conversation sequences. The labels $y_t$, $z_t$ may be co-temporal labels associated with the conversation sequence $x_t$. The labels $y_t$ may be directly connected to the conversation sequences $x_t$ using an edge such as an edge 702. Further, the clique 700 may explicitly model limited probabilistic dependencies using an edge, such as an edge 704, between at least one adjacent label sequence y, i.e., $(y_{t-1}, y_t)$ along with a current conversation sequence, $x_t$, i.e., $(x_t, y_{t-1}, y_t)$. The co-temporal labels $y_t$, $z_t$ may be linked to each other through an edge, such as an edge 706, representing simultaneous observation of the label $z_t$ while modeling the label $y_t$ for the conversation sequence $x_t$.

Figure 8:
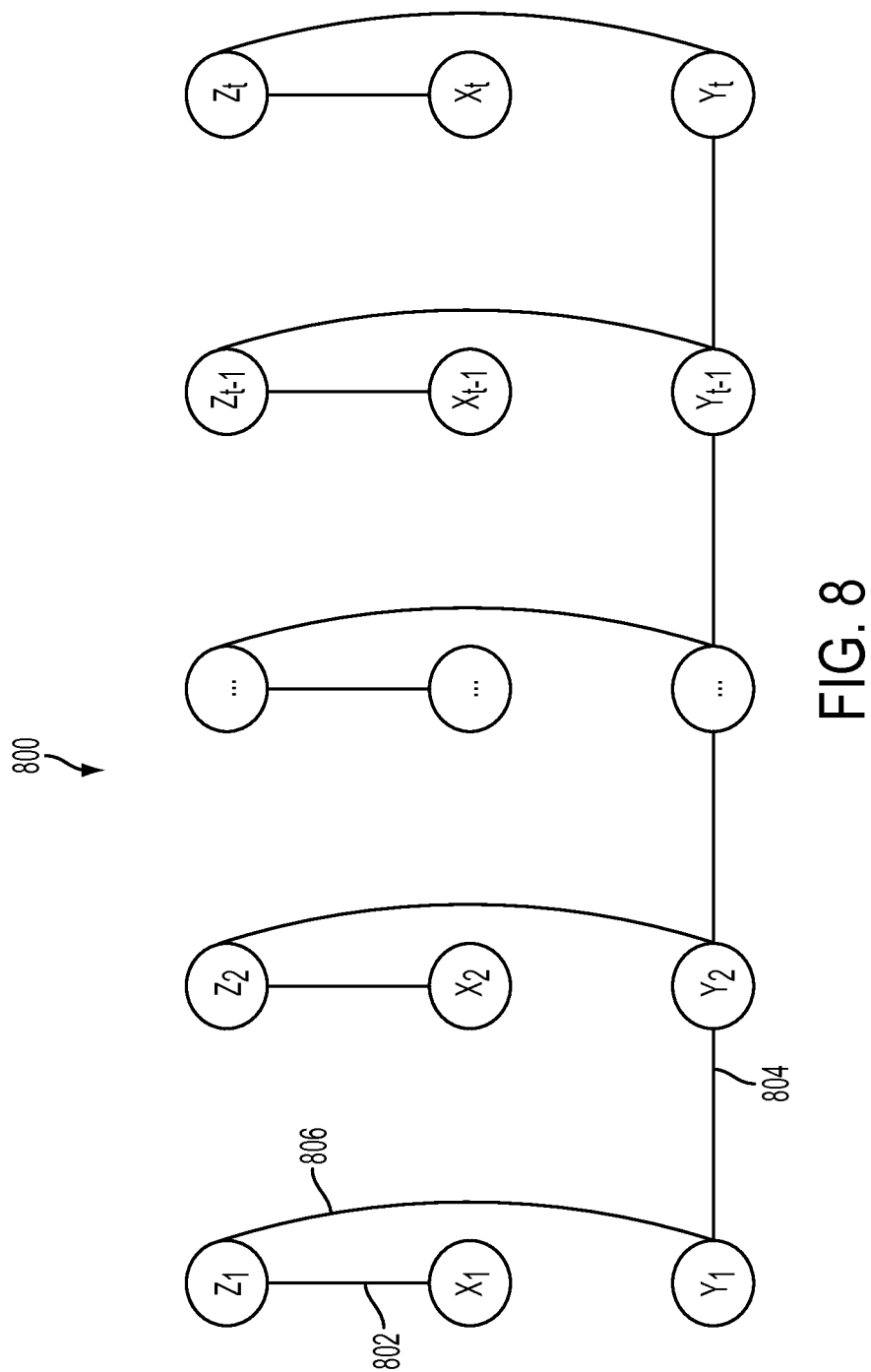
FIG. 8 is a schematic of an exemplary second type of clique for use by the data analysis device of FIG. 1, according to an embodiment of the present disclosure.

Similarly, an exemplary second type of clique 800 for Task 2 is shown in FIG. 8. The clique 800 may include multiple nodes $(x_t, y_t, z_t)$ corresponding a pair of co-temporal labels $(y_t, z_t)$ along with the current conversation sequence $x_t$ for modeling the conditional probability density of labels $z_t$, where 't' may range from one to the total number of conversation sequences. The labels $z_t$ may be directly connected to the conversation sequences $x_t$ through an edge such as an edge 802. Further, the clique 800 may explicitly model limited probabilistic dependencies using an edge, such as an edge 804, between at least one adjacent label sequence z, i.e., $(z_{t-1}, z_t)$ along with a current conversation sequence, $x_t$, i.e., $(x_t, z_{t-1}, z_t)$. The labels $y_t$, $z_t$ may be linked to each other through an edge, such as an edge 806, representing simultaneous observation of the label $y_t$ while modeling the label $z_t$ for the conversation sequence $x_t$. The first type of clique 700 may provide the label independence and the second type of clique 800 may facilitate use of label dependencies or correlations for the tasks such as Task 1 and Task 2.

Given such two cliques 700, 800 and the potential function θ defined over them, the conditional probability density of both the label sequences $y_t$ and $z_t$ for the exemplary conversation sequence $x_t$ may be written as shown in Equation 1.

$$p^y(y, z \mid x, \theta^y, \psi) = \frac{1}{U^y(x)} \prod_{t=1}^{T} \exp\left(-\prod_{\{c \in C\}} (\Phi(y_c, x_c \mid \theta^y) - \Phi(y_c, z_c, x_c \mid \psi))\right) \quad (1)$$

Equation 1 has a task y factor, i.e., $\Phi(y_c, x_c|\theta^y)$, and a label dependency factor, i.e., $\Phi(y_c, z_c, x_c|\psi)$, where C refers to a clique and $U^y(x)$ refers to a normalization factor. The "task y factor" corresponds to a task specific clique since it only considers labels from one task such as Task 1 or Task 2, and the label dependency factor may refer to a common clique since it takes labels from both the tasks such as Task 1 and Task 2.

In the model represented in Equation 1, the first clique 700 may be the task-specific clique as it only considers the label from one task, while the second clique 800 may be the common clique as it takes labels from both tasks. Since the second clique 800 may be common in both mathematical models, the first clique 700 (and label) may be the model's defining clique (and label), and corresponds to the task, i.e., Task 1, for which that model is built. Further, in these models, each type of clique may have its own parameters, i.e., task y may have its parameters $\theta^y$ and $\psi^y$ and the task z may have its own parameters $\theta^z$ and $\psi^z$. Such a model where each task has its own set of parameters may be termed as an unshared model.

In some embodiments, the parameters $\theta^y$ and $\psi^y$ corresponding to the task specific clique y may be indexed according to Task 1, and the parameters such as $\theta^z$ and $\psi^z$ corresponding to the common clique, i.e., for Task 2, may not be indexed. Such different approaches may be applied to parameter indexing due to the first set of parameters $\theta^y$ and $\psi^y$ being task specific while other set of parameters $\theta^z$ and $\psi^z$ being common (and hence shared) among all tasks.

Equation 1 may provide the probability of both the labels, i.e., (y,z), conditioned on the observed conversation sequence x, however, there is no clique that depends on the adjacent z labels, i.e., $(z_{t-1}, z_t)$. Thus though incorporating partial information from the label z, the model represented in Equation 1 still focuses on the task y. Therefore, Equation 1 may be written in terms of corresponding feature functions to represent separate models for task y (Equation 2) and for task z (Equation 4).

$$p^y(y, z \mid x, \theta^y, \psi) = \frac{1}{U^y(x)} \prod_{t=1}^{T} \exp\left(-\sum_k (\theta_k^y f_k(x_t, y_{t-1}, y_t) - \psi_k f_k(x_t, y_t, z_t))\right) \quad (2)$$

where, $\theta_k^y f_k(x_t, y_{t-1}, y_t)$ is the task y factor, $\psi_k f_k(x_t, y_t, z_t)$ is the label dependency factor, and $U^y(x)$ is the normalization factor as defined in Equation 3 shown below:

$$U^y(x) = \Sigma_{(y,z)} \Pi_{t=1}^T \exp(-\Sigma_k(\theta_k^y f_k(x_t, y_{t-1}, y_t) - \psi_k f_k(x_t, y_t, z_t))) \quad (3)$$

$$p^z(y, z \mid x, \theta^z, \psi) = \frac{1}{U^z(x)} \prod_{t=1}^{T} \exp\left(-\sum_k (\theta_k^z f_k(x_t, y_{t-1}, y_t) - \psi_k f_k(x_t, y_t, z_t))\right) \quad (4)$$

In Equation 3, $\theta_k^y f_k(x_t, y_{t-1}, y_t)$ is the task y factor and $\psi_k f_k(x_t, y_t, z_t)$ is the label dependency factor. Similarly, in Equation 4, $\theta_k^z f_k(x_t, y_{t-1}, y_t)$ is a task z factor and $\psi_k f_k(x_t, y_t, z_t)$ is the label dependency factor. Equation 4 represents a type of clique that depends on adjacent labels from task z along with the conversation sequence $x_t$, i.e., $(z_{t-1}, z_t, x_t)$. Each of the models represented in Equation 2 and Equation 4 may produce labels for both the tasks, i.e., task y and task z, respectively. In these Equations, the parameters $(\theta^y, \theta^z)$ may represent task specific parameters and parameters $\psi$, i.e., $(\psi^y = \psi^z = \psi)$, may be common to both the tasks, thereby facilitating the sharing of information between these tasks. Hence, Equations 2 and 4 may be termed as shared models.

Such task specific and shared parameters may be used to optimize predetermined objective functions being implemented to fit the data into the models of Equations 2 and 4. A variety of approaches known in the art, related art, and developed later may be implemented to defined the objective functions. In one example, Jointly Optimized with Shared Parameters (JOSP) approach may be implemented to define the objective functions. According to the JOSP approach, a joint model may be defined as a product of models represented by Equations 2 and 4 to learn both the tasks, i.e., task y and task z, simultaneously. In this joint model, the parameters such as the task specific parameters $(\theta^y, \theta^z)$ and the common parameters $\psi$ may be learned by optimizing the joint likelihood of conversation sequence x. The joint likelihood of conversation sequence x may be represented as shown in Equation 5.

$$l = \Sigma_{x,y,z} \log p^y(y,z|x,\theta^y,\psi) + p^z(y,z|x,\theta^z,\psi) - \eta(\|\theta^y\|^2 + \|\theta^z\|^2 + \|\psi\|^2) \quad (5)$$

In another example, Alternate Optimized with Shared Parameters (AOSP) approach may be implemented to define the objective functions. According to the AOSP approach, the joint likelihood function of Equation 5 may be split into separate likelihood functions for task y (as shown in Equation 6) and task z (as shown in Equation 7) and optimized alternatively.

$$l_y = \Sigma_{i=1}^n \log p^y(y_i, z_i | x_i, \theta^y, \psi) - \eta(\|\theta^y\|^2 + \|\psi\|^2) \quad (6)$$

$$l_z = \Sigma_{i=1}^n \log p^z(y_i, z_i | x_i, \theta^z, \psi) - \eta(\|\theta^z\|^2 + \|\psi\|^2) \quad (7)$$

Instead of optimizing the joint likelihood, parameter optimization may be performed in the AOSP approach. A variety of methods known in the art, related art, and developed later may be employed for parameter optimization. In one example, gradient descent may be used for parameter optimization. In alternate optimization, one step may be taken to optimize the parameter of the first model such as the model represented by Equation 6 (i.e., run only one gradient step), and then another step may be taken to optimize the parameter of the second model such as the model represented in Equation 7. Such alternate optimization may be repeated for a predetermined number of iterations based on size of the training dataset, for example, the total number of conversation sequences in the training dataset.

The likelihood functions of Equations 6 and 7 are convex; however the corresponding alternate optimization technique is not guaranteed to converge. On the other hand, the joint likelihood function of Equation 5 is convex and guaranteed to converge; however assignments for both labels y and z from their respective models such as those in Equations 2 and 4 are unavailable, thereby compromising the accuracy in assigning labels y, z to the conversation sequence x.

In order to resolve the above limitations, in one embodiment, the learning module 512 may implement a predetermined variance model for each of task y and task z in the objective function of Equation 5. The variance model may be capable of sharing information among multiple tasks in a manner that each task may be modeled independently (e.g., by way of a task specific parameter) as well as simultaneously benefit from other tasks (e.g., by way of a common parameter such as the label dependency factor among different tasks). In order to implement the variance model for each task, the learning module 512 may split the common set of parameters (i.e., the label dependency factor) further into two parts, namely, a task specific part and a common part, since the parameters corresponding to the label dependency factor may lie around a common set of parameters having their own variance specific to each task. Consequently, the common set of parameters $\psi$ may be represented as shown in Equation 8:

$$\psi^y = \psi^o + v^y \quad (8)$$

In Equation 8, $\psi^o$ may be a parameter common to all tasks and $v^y$ may be a parameter specific to a particular task, i.e., task y, among the common set of parameters $\psi$. Based on Equation 8, the model represented in Equation 2 for task y may be represented as shown in Equation 9.

$$p^y(y, z \mid x, \theta^y, \psi) = \frac{1}{U^y(x)} \prod_{t=1}^{T} \exp\left(-\sum_{k}\begin{pmatrix} \theta_k^y f_k(x_t, y_{t-1}, y_t) - \psi^o f_k(x_t, y_t, z_t) - \\ v^y f_k(x_t, y_t, z_t) \end{pmatrix}\right) \quad (9)$$

Based on the Equations 8 and 9, the likelihood of conversation sequences $x_t$ being associated with task y may be represented as shown in Equation 10.

$$l_y = \Sigma_{i=1}^{n} \log p^y(y_i, z_i \mid x_i, \theta^y, \psi^o, v^y) - \eta(\|\theta^y\|^2 + \|\psi\|^2) - \lambda\|v^y\|^2 \quad (10)$$

As shown, Equation 10 includes an interpolating factor $\lambda$ and an accuracy factor $\eta$ corresponding to the common parameter $\psi^o$. The interpolating factor $\lambda$ may enforce the mathematical model of Equation 9 to share the label dependency parameters between different tasks. A ratio $\lambda/\eta$ of the interpolating factor $\lambda$ and the accuracy factor $\eta$ may determine the amount of information being shared among the tasks. The ratio $\lambda/\eta$ may be a weighted factor, whose high value may correspond to greater amount of information being shared among tasks and a relatively smaller value of the ratio $\lambda/\eta$ may refer to a task being relatively unrelated to other tasks as if there is no relative sharing of parameters among the tasks. In other words, the interpolating factor $\lambda$ may interpolate between a shared model and a model that is completely unshared. In some embodiments, the values of $\lambda$ and $\eta$ may be inputted by a user or may be calculated based on various predetermined machine learning algorithms known in the art, related art, or developed later. Similar to Equation 10, a person having ordinary skill in the art may be able to define the likelihood of conversation sequences $x_t$ being associated with task z.

Further, similar to the existing conditional probability models such as the one represented in equation 5, the variance model (e.g., represented by equation 10) may represent the data likelihood either jointly or alternatively for task y. The joint data likelihood defined based on equation 8 may be termed as Jointly Optimized Variance Model (JOVM) and the alternative data likelihood based on equation 8 may be referred to as Alternate Optimized Variance Model (AOVM). As discussed for Equations 5, 6, and 7, a person having ordinary skill in the art will be able to define JOVM and AOVM for task y and task z based on Equations 8, 9, and 10.

Various methods known in the art, related art, or developed later may be used to learn the one or more tasks by learning the parameters based on the variance model such as the one represented in Equation 10 for task y and to draw related inferences. In one example, the limited-memory Broyden-Fletcher-Goldfarb-Shanno (L-BFGS) algorithm may be implemented for parameter learning and the belief propagation or variational inference algorithm may be used for drawing inferences from the learned parameters, for example, in Equation 10.

In some embodiments, the learning module 512 may be configured to train, test, and tune the parameters in the variance models such as represented in Equation 10 by comparing the parameter values with those in other existing models such as the models based on JOSP approach (e.g., as shown in Equation 5) and AOSP approach (e.g., as shown in Equations 6 and 7). The parameters may be tuned by varying the values of the ratio $\lambda/\eta$ until maximum accuracy in labeling a received dataset is achieved. The accuracy of the mathematical models may be defined as a fraction of correctly labeled tokens or features in sequences, such as conversation sequences, present in a test dataset. The accuracy of variance models such as Equation 10 may be inversely proportional to the complexity of the training dataset. In one example, the complexity of the training dataset may be defined in terms of the size of the training dataset (i.e., training size). Therefore, lesser the training size, greater is the complexity of the training dataset, and better is the accuracy of variance models such as Equation 10. In another example, fewer the number of labeled sequences such as the conversation sequences in the training dataset, greater is the complexity of the training dataset, and better is the accuracy of the variance models.

In some embodiments, the variance models such as Equations 9 and 10 for each of the tasks may be implemented to the determine performance metrics of a customer service agent 102. The performance metrics may be employed to: (1) measure the effectiveness of social-CRM; and (2) identify issues that need follow up. Based upon the dialogue act and the issue status labels, various effectiveness measures may be derived that may be consumed in already existing performance metrics of any CRM system. Few exemplary categories of such metrics may include, but not limited to, issue monitoring, issues summary, customer satisfaction, and performance of the customer service agent 102.

Issue monitoring may involve several metrics that characterize the current state of a conversation. For example, the variance models assist to identify issue resolution rate, well-handled conversations, and assistance conversations using the dependencies among labels of different tasks. The issue resolution rate may be defined as a fraction of the conversations whose first message or sequence (e.g., sentence) may be labeled as OPEN and last sequence may be labeled as SOLVED. The well-handled conversations may refer to a fraction of the conversations whose first message or sequence may be labeled as OPEN and last sequence may be labeled as either of SOLVED, CLOSED, and CHANGE CHANNEL. The assistance conversations may be defined as a fraction of the conversations whose first message or sequence may be labeled as OPEN and REQUEST.

Issues Summary may involve the conversation sequences (i.e., sentences) that may include either of the labels, namely, COMPLAINT, REQUEST, ANNOUNCEMENT and OPEN, and may be assumed primary issues faced by social media users. Further clustering of these conversation sequences may identify types of issues processed by a social-CRM system such as the data analysis device 116 using the defined variance models for each task.

Customer satisfaction may be related to customer conversation rate and customer "hang up" rate, which may be learned by the applying the variance models such as the Equation 10 for each of the predetermined tasks learned from or performed on the training dataset. The customer conversion rate may be defined as a fraction of the conversations whose first message or sequence may be labeled as COMPLAINT or REQUEST and last sequence may be labeled as either of THANKS, RESPOS, SOLVED, COMPLIMENT, and ANSWER. The customer "hang-up" rate may be defined as a fraction of the conversations whose tail messages may be labeled as COMPLAINT or REQUEST and no message or sequences may be labeled as THANKS, RESPOS, or COMPLIMENT.

The performance of the customer service agent may involve performance metrics, which may be derived similarly by combining observations made for the issues monitoring and the customer satisfaction rate on per agent basis upon applying the variance models for each of the tasks to the training dataset.

Further, the classification module 514 may implement the variance models such as the one represented by Equation 10 for performing task y and task z to label a live dataset such as agent-customer conversation sequences based on a trained model corresponding to Equation 10 and other variance models for each of the tasks using the optimally tuned weighted ratio $\lambda/\eta$.

Figure 9:
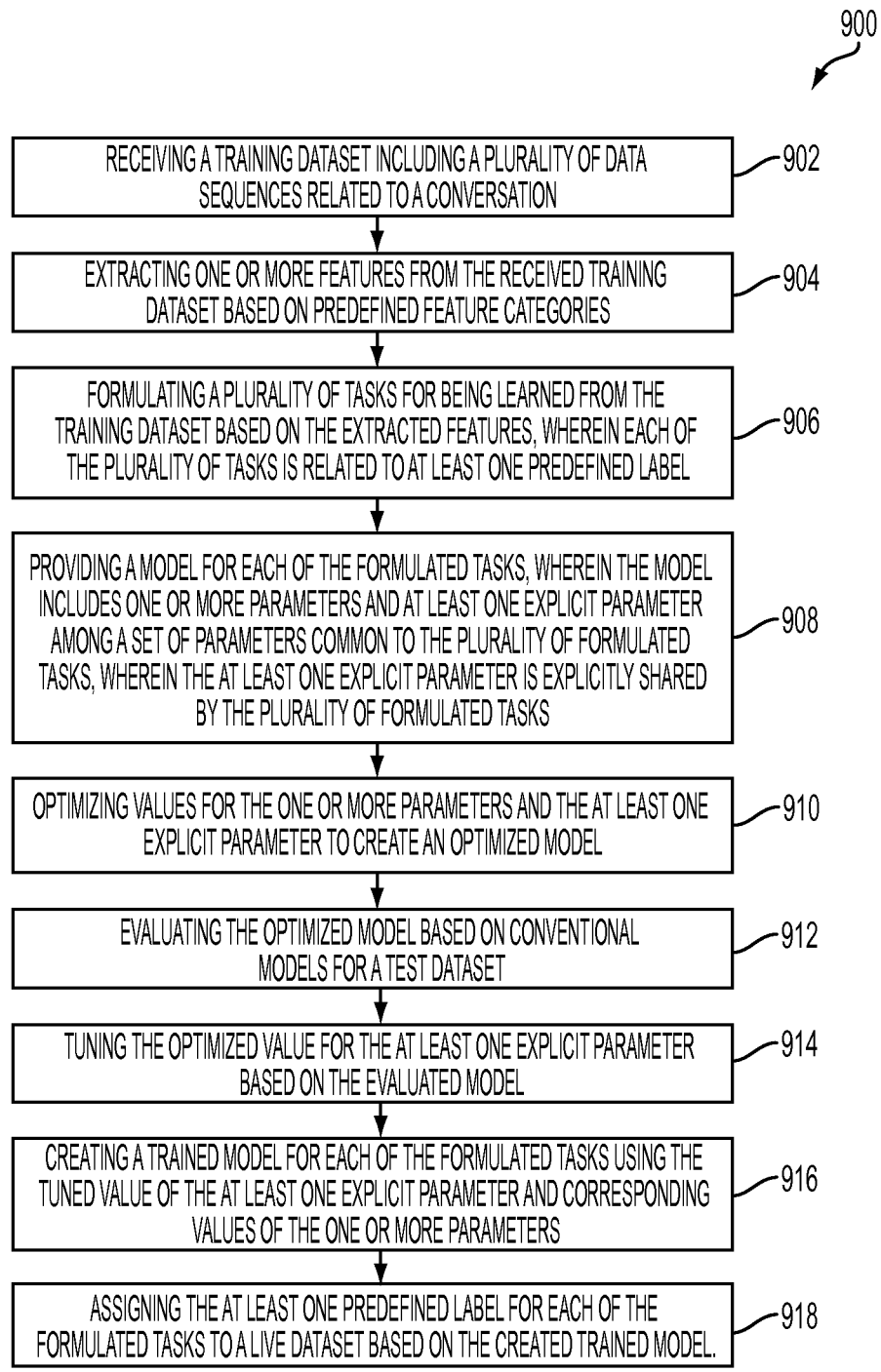
FIG. 9 illustrates an exemplary method for implementing the data analysis device of FIG. 1, according to an embodiment of the present disclosure.

FIG. 9 illustrates an exemplary method for implementing the data analysis device 116, according to an embodiment of the present disclosure. The exemplary method 900 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 900 is described is not intended to be construed as a limitation, and any number of the described method blocks may be combined or otherwise performed in any order to implement the method, or an alternate method. Additionally, individual blocks may be deleted from the method without departing from the spirit and scope of the present disclosure described herein. Furthermore, the method 900 may be implemented in any suitable hardware, software, firmware, or combination thereof, that exists in the related art or that is later developed.

The method 900 describes, without limitation, implementation of the exemplary data analysis device 116. One of skill in the art will understand that the method 900 may be modified appropriately for implementation in a various manners without departing from the scope and spirit of the disclosure. The method 900 may be implemented, in at least some embodiments, by the learning module 512 of the data analysis device 116. For example, the learning module 512 may be configured using the processor(s) 502 to execute computer instructions to perform operations of employing one or more models for multiple tasks to label agent-customer conversations.

At step 902, a training dataset including multiple conversation sequences is received. The data analysis device 116 may operate in communication with an agent device 108 of a customer service agent 102 interacting with a customer 106 via the customer device 110 over social media (e.g., Facebook™, Twitter™, etc.). During such interactions, the agent-customer conversations may be received as a training dataset by the data analysis device 116. The conversations may include a variety of conversation sequences corresponding to textual data, or any of the audio data, video data, and symbolic data converted into textual data, or any combination thereof. In one example, the data collection module 508 may synchronously or asynchronously receive signals corresponding to the textual data such as Twitter conversations between the customer 106 and the customer service agent 102 as the training dataset. Such conversations may include natural language text sequences such as sentences having multiple words, emoticons, symbols (e.g., at the rate "@", hash "#", underscore "_", etc.), and so on. In one embodiment, the conversations in the training dataset may be labeled based on one or more aspects such as: (1) nature of dialogue between the customer 106 and the customer service agent 102 (namely, Dialogue Act); and (2) nature of state of the issue being discussed by the customer 106 and the agent 102 (namely, Issue Status).

At step 904, one or more features are extracted from the received training set based on predefined feature categories. The feature extraction module 510 may be configured to extract various features from the training dataset based on one or more predefined feature categories or predefined features types stored in the database 516. In one embodiment, the feature extraction module 510 may extract one or more features from the received Twitter conversations based on feature categories such as those mentioned in FIG. 6. For example, a Twitter conversation may include a conversation sequence "I live in New York #HOMETOWN". From this exemplary conversation sequence, the feature extraction module 510 may extract five features including the first four features, namely, "I", "live", "in", and "New York", corresponding to the feature category "Word 1-gram and 2-grams" and the fifth feature, namely, "#HOMETOWN", corresponding to the feature category "#uppercase" based on both these feature categories being mentioned in FIG. 6.

At step 906, a plurality of tasks is formulated for being learned from the training dataset based on the extracted features. The learning module 512 may be configured (e.g., by a user using the processor(s) 502) to identify multiple tasks on the received training dataset. These tasks may be identified to learn one or more aspects of the training dataset. In one embodiment, the learning module 512 may be configured to determine the issue status (referred to as Task 1) and nature of conversation or dialogues (referred to as Task 2) from the agent-customer conversations received as the training dataset. Each of the tasks may be related to at least one predefined label associated with each conversation sequence of the training dataset. For example, the determination of the issue status task, i.e., Task 1, may be related to at least one of the predefined labels such as those mentioned in FIG. 2; and the determination of the dialogue act task, i.e., Task 2, may be related to at least one of the predefined labels such as those mentioned in FIG. 3. The relation among various predefined tasks by way of these predefined labels may determine the capability of the predetermined learning method 900 to exploit the structure of these tasks simultaneously.

At step 908, a model for each of the formulated tasks is provided. The learning module 512 may be configured, for example, by a user using the processor(s) 502, to define parametrically flexible objective mathematical models for each of the formulated tasks, where each model may be capable of trading variance among parameters shared among different tasks. In one embodiment, the learning module 512 may be configured to define an objective model for each task, such as the model in Equations 9 and 10 for a Task y corresponding to Task 1. Similar Equations or models may be defined for other tasks. Each model may include one or more parameters and at least one explicit parameter, which may be common to models of all the predefined tasks. For example, a joint probability distribution (e.g., Equation 9) may include a parameter such as $\psi_k^o f_k(x_t, y_t, z_t)$, which may be explicitly shared with models of each of the tasks. In this explicit parameter, $f_k$ is a mathematical function calculated for each value of k, which may range over the extracted features. In other words, the value of k may depend on the number of extracted features and the number of corresponding labels related to each of the tasks, i.e., if the number of extracted features, i.e., $x_t$, are six; the number of labels related to task $y_t$ are four; and the number of labels related to task $z_t$ are three, then the value of k may range from one to the product of: (1) the number of extracted features; (2) the number of labels related to $y_t$; and (3) the number of labels related to $z_t$, i.e., (6×4×3=72). Further, Equation 10 corresponding to the likelihood of a task such as task y may be determined under the model represented by Equation 9. Equation 10 may include a weighted factor ratio $\lambda/\eta$, which may be tuned to introduce a controllable variance for simultaneous learning among different related tasks. Such tuning of the weighted factor ratio $\lambda/\eta$ may make the label dependency factor such as $\psi_k f_k(x_t, y_t, z_t)$ shown in Equations 2 and 4, and therefore, the machine learning of different tasks flexible.

At step 910, values for the one or more parameters and the at least one explicit parameter are optimized. In one embodiment, the learning module 512 may be configured to optimize values of various parameters including the explicit parameter in the variance models (e.g., Equation 10) for each of the tasks such as task y. In some embodiments, the values may be optimized alternately, since the models for each of the tasks share at least one parameter such as the explicit parameter. In such alternate optimization, the learning module 512 may be configured to take one step of an optimization method to optimize the parameters of a first model such as the model represented in Equation 10 for task y, and then take one step of the optimization method to optimize the parameters of another Equation (not shown) for task z. Various optimization methods known in the art, related art, or developed later including gradient descent method and limited-memory Broyden-Fletcher-Goldfarb-Shanno (L-BFGS) method may be implemented by the learning module 512. The process of alternate optimization may be repeated for a predetermined number of iterations based on the calculated value of k as discussed in above at step 908.

Optimization of the parameters may refer to a condition that results in relative superior performance within the context of the disclosure and is not limited to any type of mathematically-provable optimum value of any particular parameter. In one embodiment, such optimization may be performed to maximize the conditional log likelihood (such as mentioned in Equation 10) of each task being performed on the training dataset to create an optimized model. The corresponding optimized parameter values may be inferred using any of the variety of inference methods known in the art, related art, or developed later including the Viterbi method.

In some embodiments, although each of the models may provide assignment for labels corresponding to all the tasks such as Task 1 and Task 2 due to the explicit parameter, the learning module 512 may be configured to consider the label assignments for each task from their respective models. For example, a label assignment for Task y may be considered based on the corresponding model (e.g., the model in Equation 9) and a label assignment for Task z may be considered based on its respective model (not shown).

At step 912, the optimized model is evaluated based on conventional models for a test dataset. In one embodiment, the learning module 512 may be configured to evaluate the optimized model based on conventional models for a test dataset. The conventional models may correspond to various approaches such as an unshared approach, JOSP, AOSP, factorial conditional random fields (factorial CRFs) and so on. The learning module 512 may evaluate the accuracy of the optimized model with respect to the conventional models being implemented on the test dataset. Accuracy of the model may be defined as a fraction of correctly labeled tokens or features in sequences present in the test dataset. The learning module 512 may determine the accuracy of a model based on a corresponding task. In other words, label assignments may be considered based on a model corresponding to a particular task, despite of each of the task-specific models being capable of providing label assignments for the other tasks for determining the accuracy of each model such as the optimized model.

At step 914, the optimized value for the at least one explicit parameter is tuned based on the evaluated model. Based on the evaluation of the optimized model, the learning module 512 may tune the value of the explicit parameter such as the weighted factor ratio $\lambda/\eta$ until the conditional log likelihood (e.g., the one represented in Equation 10) for each task is maximized. In other words, the learning module 512 may automatically tune the models for each of the tasks by varying the value of the weighted factor ratio $\lambda/\eta$ to favor the parameters of a task that has more learning being transferable to other tasks. In one example, the learning module 512 may increase the value of the weighted factor ratio $\lambda/\eta$ to increase the amount of learning being exchanged among different tasks, since the weighted factor is associated with a parameter, which is common to all the tasks (as shown in Equation 10) so as to maximize the conditional log likelihood of each task being performed on the training dataset. Since the ratio $\lambda/\eta$ is directly proportional to the interpolating factor $\lambda$ and inversely proportional to the accuracy factor 11, a tunable value of the ratio $\lambda/\eta$ may be limited by the accuracy of the model that supports maximum possible transferable learning by maximizing the conditional log likelihood of each task. In the above embodiment, the learning module 512 may increase the value of the weighted factor ratio $\lambda/\eta$ either by increasing a value of the interpolating factor $\lambda$ or by decreasing a value the accuracy factor $\eta$. In some embodiments, the steps 912 and 914 may be removed from the method 900.

At step 916, a trained model is created for each of the formulated tasks using the tuned value of the at least one explicit parameter and corresponding values of the one or more parameters. The learning module 512 may use the tuned value of the ratio $\lambda/\eta$ to determine corresponding values of other parameters in the models for various tasks such that the conditional log likelihood of each task is maximized. Based on the tuned value of the ratio $\lambda/\eta$ and the correspondingly determined values of other parameters, the learning module 512 may create a trained model for each of the tasks such as Task 1 and Task 2.

At step 918, the at least one predefined label is assigned for each of the formulated tasks to a live dataset based on the corresponding created trained model. The classification module 514 may be configured to employ a trained model for each of the corresponding tasks to classify various conversation sequences in a live dataset using predetermined labels associated with each of the tasks. For example, a model represented in Equation 10 for task y corresponding to Task 1 may be trained, as discussed above, and implemented on the live dataset to label each conversation sequence of the live dataset using the task-specific labels such as those mentioned in FIGS. 2 and 3. The classified conversation sequences in the live dataset may be outputted by the processor(s) 502 for further processing by the data analysis device 116 or any other networked device, or for being stored in the database 516.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A computer-implemented method for automatically analyzing a conversational sequence between a plurality of users, the method comprising:
   receiving, using a data collection module on a computer comprising a processor and memory, signals corresponding to a training dataset including a plurality of data sequences related to the conversational sequence;
   extracting, using a feature extraction module on the computer, at least one feature from the received training dataset based on predefined feature categories;
   formulating, using a learning module on the computer, a plurality of tasks for being learned from the training dataset based on the extracted at least one feature, wherein each of the plurality of tasks is related to at least one predefined label;
   providing, using the learning module on the computer, a model for each of the plurality of formulated tasks, wherein the model includes one or more parameters having a set of parameters common to the plurality of formulated tasks, wherein the set of parameters includes at least one label dependency factor that is an explicit parameter being explicitly shared with each of the plurality of formulated tasks;
   optimizing, using the learning module on the computer, values for the one or more parameters and the at least one explicit parameter to create an optimized model;
   creating, using the learning module on the computer, a trained model for each of the plurality of formulated tasks using an optimized value of the at least one explicit parameter and corresponding values of the one or more parameters;
   assigning, using a classification module on the computer, the at least one predefined label for each of the plurality of formulated tasks on to a live dataset based on the corresponding created trained model; and
   outputting, using the computer, signals corresponding to the live dataset assigned with the at least one predefined label for each of the plurality of formulated tasks.

2. The method of claim 1, wherein the step of creating a trained model further comprises:
   evaluating, using the learning module, the optimized model based on conventional models determined for a test dataset;
   tuning, using the learning module, the optimized value for the at least one explicit parameter based on the evaluated optimized model; and
   creating, using the learning module, a trained model for each of the plurality of formulated tasks using the tuned value of the at least one explicit parameter and corresponding values of the one or more parameters.

3. The method of claim 2, wherein the optimized value for the at least one explicit parameter is tuned until a conditional log likelihood of a corresponding task among the plurality of formulated tasks is maximized, wherein the optimized value is tuned by varying the value of a predetermined weighted factor to optimize the corresponding one or more parameters for at least one task among the plurality of formulated tasks.

4. The method of claim 1, wherein the predefined feature categories include at least one of a "Word 1-grams and 2-grams", "Segment position in the conversation", "Segment position in a conversation sequence", "Sender", "Contains email", "#Upper case", "# Punctuation", "#Special punctuation", "Positive Sentiment", "Negative Sentiment", "Category of previous sequence", "Category of previous sequence of the same author", and "Category of previous sequence of a different author".

5. The method of claim 1, wherein a first task among the plurality of formulated tasks is associated with a first predefined label and a second task among the plurality of formulated tasks is associated with a second predefined label, wherein the first predefined label and the second predefined label are correlated.

6. The method of claim 5, wherein the first task corresponds to a task for determining an issue status in the conversational sequence and a second task corresponds to a task for determining a nature of the conversational sequence.

7. The method of claim 1, wherein the plurality of data sequences are natural language text sequences including a plurality of sentences, wherein each of the plurality of sentences includes one or more words.

8. The method of claim 1, wherein the trained model has a predefined accuracy, which is inversely proportional to the complexity of the training dataset, wherein the complexity of the training dataset corresponds to at least one of size of the training dataset and a number of pre-labeled data sequences in the training dataset.

9. The method of claim 1, wherein the plurality of data sequences are prelabeled using a plurality of predetermined labels corresponding to at least one of the plurality of formulated tasks.

10. The method of claim 9, wherein the plurality of predetermined labels includes at least one of "OPEN", "SOLVED", "CLOSED", and "CHANGED CHANNEL" corresponding to a task for determining an issue status in the conversational sequence among the plurality of formulated tasks.

11. The method of claim 9, wherein the plurality of predetermined labels includes at least one of "COMPLAINT", "REQUEST", "APOLOGY", "ANSWER", "RECEIPT", "COMPLIMENT", "RESPONSE TO POSITIVITY", "GREETING", "THANK", "ANNOUNCEMENT", "SOLVED", and "OTHER" corresponding to a task for determining a nature of the conversational sequence among the plurality of formulated tasks.

12. The method of claim 1, further comprising, determining, by the computer using the trained model, a status of an issue in the conversational sequence.

13. The method of claim 1, further comprising, determining, by the computer using the trained model, a nature of the conversational sequence.

14. The method of claim 1, wherein the set of parameters include at least one parameter having variance specific to each of the plurality of formulated tasks.

15. A system for automatically analyzing a conversation between a plurality of users, the system comprising:
   a data collection module on a computer comprising a processor and memory configured to receive signals corresponding to a training dataset including a plurality of data sequences related to the conversation;

a feature extraction module on the computer configured to extract at least one feature from the received training dataset based on predefined feature categories;
a learning module on the computer configured to:
formulate a plurality of tasks for being learned from the training dataset based on the extracted at least one feature, wherein each of the plurality of tasks is related to at least one predefined label;
provide a model for each of the plurality of formulated tasks, wherein the model includes one or more parameters having a set of parameters common to the plurality of formulated tasks, wherein the set of parameters includes at least one label dependency factor, that is an explicit parameter, which is explicitly shared with each of the plurality of formulated tasks;
optimize values for the one or more parameters and the at least one explicit parameter to create an optimized model; and
create a trained model for each of the plurality of formulated tasks using an optimized value of the at least one explicit parameter and corresponding values of the one or more parameters; and
a classification module on the computer configured to assign the at least one predefined label for each of the plurality of formulated tasks on to a live dataset based on the created trained model, wherein the computer is configured to output signals corresponding to the live dataset assigned with the at least one predefined label for each of the plurality of formulated tasks.

16. The system of claim 15, wherein the set of parameters include at least one parameter having variance specific to each of the plurality of formulated tasks.

17. The system of claim 15, wherein the learning module is configured to vary the value of a predetermined weighted factor for tuning the value of the at least one explicit parameter for optimization until a conditional log likelihood of a corresponding task among the plurality of formulated tasks is maximized.

18. The system of claim 15, wherein the predefined feature categories include at least one of a "Word 1-grams and 2-grams", "Segment position in the conversation", "Segment position in a conversation sequence", "Sender", "Contains email", "#Upper case", "# Punctuation", "#Special punctuation", "Positive Sentiment", "Negative Sentiment", "Category of previous sequence", "Category of previous sequence of the same author", and "Category of previous sequence of a different author".

19. The system of claim 15, wherein a first task among the plurality of formulated tasks is associated with a first predefined label and a second task among the plurality of formulated tasks is associated with a second predefined label, wherein the first predefined label and the second predefined label are correlated.

20. The system of claim 19, wherein the first task corresponds to a task for determining an issue status in the conversation and a second task corresponds to a task for determining a nature of the conversation.

21. The system of claim 15, wherein the plurality of data sequences are natural language text sequences including a plurality of sentences, wherein each of the plurality of sentences include one or more words.

22. The system of claim 15, wherein the plurality of data sequences are prelabeled using a plurality of predetermined labels corresponding to at least one of the plurality of formulated tasks.

23. The system of claim 22, wherein the plurality of predetermined labels includes at least one of "OPEN", "SOLVED", "CLOSED", and "CHANGED CHANNEL" corresponding to a task for determining an issue status in the conversation among the plurality of formulated tasks.

24. The system of claim 22, wherein the plurality of predetermined labels includes at least one of "COMPLAINT", "REQUEST", "APOLOGY", "ANSWER", "RECEIPT", "COMPLIMENT", "RESPONSE TO POSITIVITY", "GREETING", "THANK", "ANNOUNCEMENT", "SOLVED", and "OTHER" corresponding to a task for determining
a nature of the conversation among the plurality of formulated tasks.

25. The system of claim 15, wherein the trained model has a predefined accuracy, which is inversely proportional to the complexity of the training dataset, wherein the complexity of the training dataset corresponds to at least one of size of the training dataset and a number of pre-labeled data sequences in the training dataset.

* * * * *